United States Patent [19]

Rojo, Jr. et al.

[11] Patent Number: 4,629,904
[45] Date of Patent: Dec. 16, 1986

[54] MICRO-HYDROELECTRIC POWER PLANT

[76] Inventors: Agustin Rojo, Jr., Terrazas de Tintillo #16, Guaynabo, P.R. 00657; Jorge Leiseca, Condominio Costa Azul, Apt. 11A Taft St., #2, Santurce, P.R. 00907

[21] Appl. No.: 591,952

[22] Filed: Mar. 21, 1984

[51] Int. Cl.$^4$ ............................................... F03B 13/08
[52] U.S. Cl. ...................................... 290/52; 290/1 R; 290/53; 60/398; 417/334
[58] Field of Search ............... 290/1 R, 40, 52, 53; 60/327, 398, 495–507; 415/500; 417/334, 321, 411, 423

[56] References Cited

U.S. PATENT DOCUMENTS

| | | | |
|---|---|---|---|
| 4,117,676 | 10/1978 | Atencio | 60/398 X |
| 4,182,123 | 1/1980 | Ueda | 60/398 X |
| 4,188,788 | 2/1980 | Eller | 60/398 |
| 4,311,410 | 1/1982 | Atencio | 290/52 X |
| 4,364,228 | 12/1982 | Eller | 290/52 X |
| 4,437,017 | 3/1984 | Österberg | 290/52 |
| 4,467,216 | 8/1984 | Murphy | 290/52 X |
| 4,476,396 | 10/1984 | Calvert | 290/53 |

Primary Examiner—William M. Shoop, Jr.
Assistant Examiner—Shik Luen Paul Ip
Attorney, Agent, or Firm—Erwin M. Barnett

[57] ABSTRACT

A small-scale hydroelectric generator has a micro-hydro axial-flow turbine mounted in a lower end of a penstock, preferably of the siphon type, through which water is diverted from an intake basin. The turbine comprises a stator section formed with an axial core providing an annular passageway having an outlet end in close proximity to a rotor of a coaxial adjacent rotor section. The blades of the rotor have a length equal to the internal radius of the passageway. A plurality of flaps are arranged in an expandable circle between the stator section and rotor. A float mechanism located in the intake basin follows the water level and controls the extended positions of the flaps reducing the water flow through the penstock in a predetermined relation to the water level. The annular passageway has fixed vanes directing the stream of water in a helical swirling motion of predetermined pitch to impinge upon the blades which are disposed to receive the stream at an optimum angle of 90°. The generator is located remote from the turbine with a closed hydraulic system comprising a variable displacement pump located at and driven by the turbine and a hydraulic motor located at and driving the generator. The pump has a flow control driving the motor at a constant RPM at all acceptable load conditions placed on the generator.

21 Claims, 9 Drawing Figures

MICRO-HYDROELECTRIC POWER PLANT

BACKGROUND OF THE INVENTION

1. Field of the Invention

This invention relates to small-scale hydroelectric generators, each utilizing a siphon flow through a penstock having an axially mounted turbine rotor, and more particularly is directed to the construction of stationary vanes and the fixed blades of the rotor whereby the efficiency of the turbine is maximized and to the incorporation of adjustable flaps automatically controlling the flow of water through the penstock relative to the quantity of water available in the source, namely, the river in which the turbine is installed. The invention is also directed to a closed hydraulic fluid system which transfers the energy developed in the turbine to an electric generator at a location remote from the turbine and river bed and utilizes the cooling effect of the water passing through the penstock to maintain the hydraulic fluid, which has a tendency to overheat, at temperatures for efficient operation.

2. Description of the Prior Art

Axial-flow reaction turbines of the Kaplan type, being well known and widely used, are equipped either with adjustable blades on the runners, herein designated as rotors, or fixed blade rotors and may also have butterfly valves for controlling the flow of water through the penstock. Guide vanes may also be fixed or adjustable. Whereas the Kaplan type turbine is cost efficient for relatively large installations, those adaptable to smaller streams, such as for 3 to 100 KW capacity, are either non-existent or much too costly to install when considering the relatively small generating capacity of such rivers. Also, in conventional small-scale hydroelectric power plants utilizing the siphon penstock, the electric generator is either intimately combined with the turbine as a unit within the penstock or is located in close proximity to the river bed being driven directly by the turbine, and in both cases requiring costly waterproofing to insure against water damage, especially during flood conditions, which in turn makes servicing difficult, time consuming and expensive.

There clearly is a need to utilize the energy of smaller streams for generation of electric power. Such streams, namely, those having at least 3 cubic feet per second flow and bed slopes in excess of 10% along sections thereof which are capable of supplying power in the 3 to 100 KW range, exist in many rural areas especially in so-called emerging nations where the rate of consumption of electricity for a given rural area may not justify the capital expenditures necessary for installation and maintenance of long power lines due to the distances from the central power source and the topography of the terrain.

SUMMARY OF THE INVENTION

Among the objects of the invention is to satisfy the hereinbefore described need by providing a micro-hydroelectric generating plant comprising a small-scale turbine which preferably utilizes a siphon penstock for its simplicity and economy of installation and function, which has an axial-flow reaction turbine rotor incorporating blades of predetermined fixed pitch cooperating with fixed vanes located in an annular constriction of the penstock, which vanes deliver an actuating flow of water against the blades of the rotor at an optimum angle on the order of 90° for maximum transfer of energy from the water flow to the turbine, which penstock has means responsive to the water level at the penstock intake basin controlling the volume of water flowing through the penstock while directing the flow, when reduced, to impinge upon the radially outer end portions of the rotor blades maintaining maximum energy transfer, which rotary motion and power developed by the turbine drives a hydraulic pump system including a hydraulic motor driven electric generator enabling the latter to be located high and dry, that is, remote from the river bed, and thus free from problems created by flooding without expensive concrete installations.

The invention features an axial-flow turbine comprising stator and rotor sections having separably joined cylindrical housings mounted in a penstock which delivers a predetermined head to the turbine from a head water basin. The stator section has a bullet-shaped axial core providing an annular passageway between the core and housing and a plurality of equally spaced fixed vanes extending substantially longitudinally and radially between the housing and core. Each vane has a curved delivery end portion extending from a longitudinal inlet portion disposed parallel to the axis of the core whereby the stream of water passing through the annular passageway is diverted in a helical swirling motion about the core. A rotor, mounted for axial rotation in the rotor section, has a plurality of equally spaced blades, each extending radially from a hub and of a height from hub to tip conforming to the radius of the annular passageway and located in close proximity thereto. Each blade has a water impinging surface disposed at a predetermined angle to the axial plane of the rotor normal to the angular disposition of the trailing ends of the curved delivery end portions of the vanes. The curvature and contour of the curved delivery ends of the vanes also curve radially from core to housing in the direction opposite to the flow of water through the turbine whereas that of the water impinging surfaces of the blades curve radially from hub to tip in the direction of flow to maintain the predetermined angular relation and to compensate for the increase in linear velocity of points on the blade surface of the rotating rotor as their distances from the axis increase.

Another feature of the invention is the automatic control of the volumetric flow of water through the penstock and turbine to correspond to the water available at the source by flaps which constrict the annular passageway outwardly from the core and direct the resulting stream to impinge upon the tip portion of the rotor blades taking advantage of the optimum torque by applying the driving force at a maximum moment arm. The flaps, as components of a flow control operator mechanism housed within the axial core, are arranged in an expandable circle and mounted on lever arms for simultaneous reciprocation from fully retracted positions, providing unrestricted maximum flow, radially outwardly across the outlet end of the annular passageway, providing progressive constriction to a fully extended position for a predetermined minimum flow. The lever arms and flaps are operated by an expander comprising a spool mounted for axial rotation within the core and having a pair of eccentric connectors formed as opposite flanges. One of the connectors has linkages to pivot each lever arm for adjusting the flaps as the spool roates from a spring biased position to an advanced, flap closing position. The other connector is linked to the actuators of the flaps which comprise a spring biasing means rotating the spool in a first direction retaining the flaps in a normally open, fully retracted position and a weighted float which overcomes the biasing spring and rotates the spool in an opposite direction to extend the flaps. The weighted float is located in the head water basin and responds to any drop from a predetermined water level. A lever, pulley and cable arrangement passes through a conduit from the exterior of the stator section housing into the core and operatively connects the weighted float to the other eccentric connector, whereby a drop in water level correspondingly rotates the spool in the direction opposite to the spring bias extending the flaps into the annular passageway. A rise in water level relieves the action of the weighted float enabling the sping bias to rotate the spool in the first direction and accordingly retract the flaps.

A third feature of the invention utilizes a closed hydraulic system to transfer the energy output of the turbine to the electric generator at a location remote from the river bed. The hydraulic system comprises a variable displacement pump mounted in close proximity to the turbine to be driven by a power take-off from the rotor, a hydraulic motor driving the electric generator at the remote location and a pair of hydraulic fluid conduits extending therebetween. A pressure sensitive flow control enables the pump to deliver a flow of predetermined constant volume of hydraulic fluid to drive the motor and hence the electric generator at a constant desired RPM at all acceptable load conditions placed on the generator. The flow control and pump coacting with the hydraulic motor and the turbine compensate for variations both in generator load conditions and in turbine output resuling from changes in the volumetric flow of water through the penstock in accordance with the availability at the source as determined by the weighted float, thus providing a versatile micro-hydroelectric power plant which is inexpensive to build, install and maintain, eliminating the need for costly and complicated mechanical and/or electronic control devices and equipment.

DESCRIPTION OF THE PREFERRED EMBODIMENT

Figure 1:
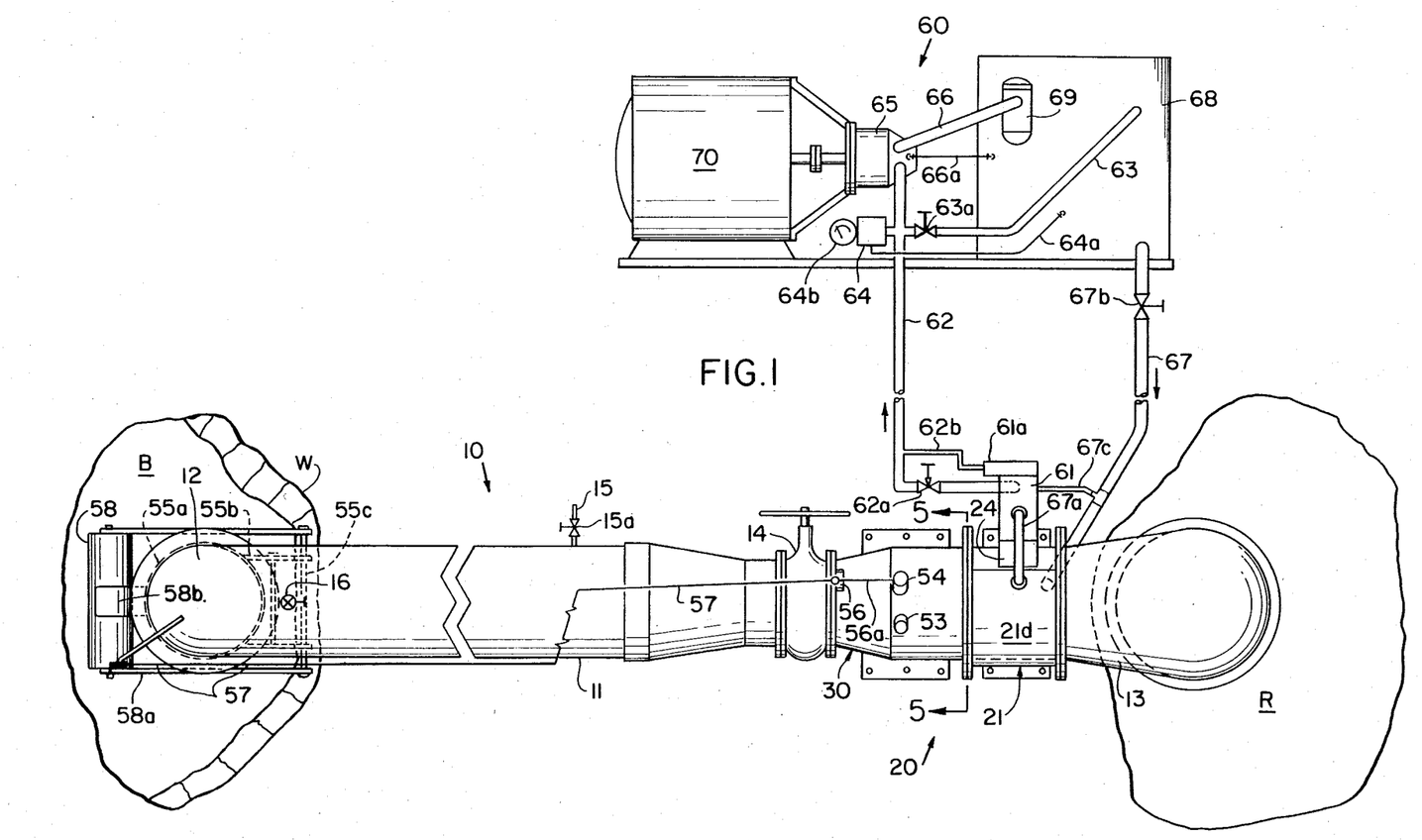
FIG. 1 is a top plan view of a small-scale turbine mounted in a siphon penstock installed in a river and driving a hydraulic pump of a closed hydraulic energy transfer system embodying the invention. The pump is mounted on the turbine with the other components of the hydraulic system including the hydraulic motor, electric generator and reservoir, all of which are remotely located, illustrated schematically.
Figures 2, 9:
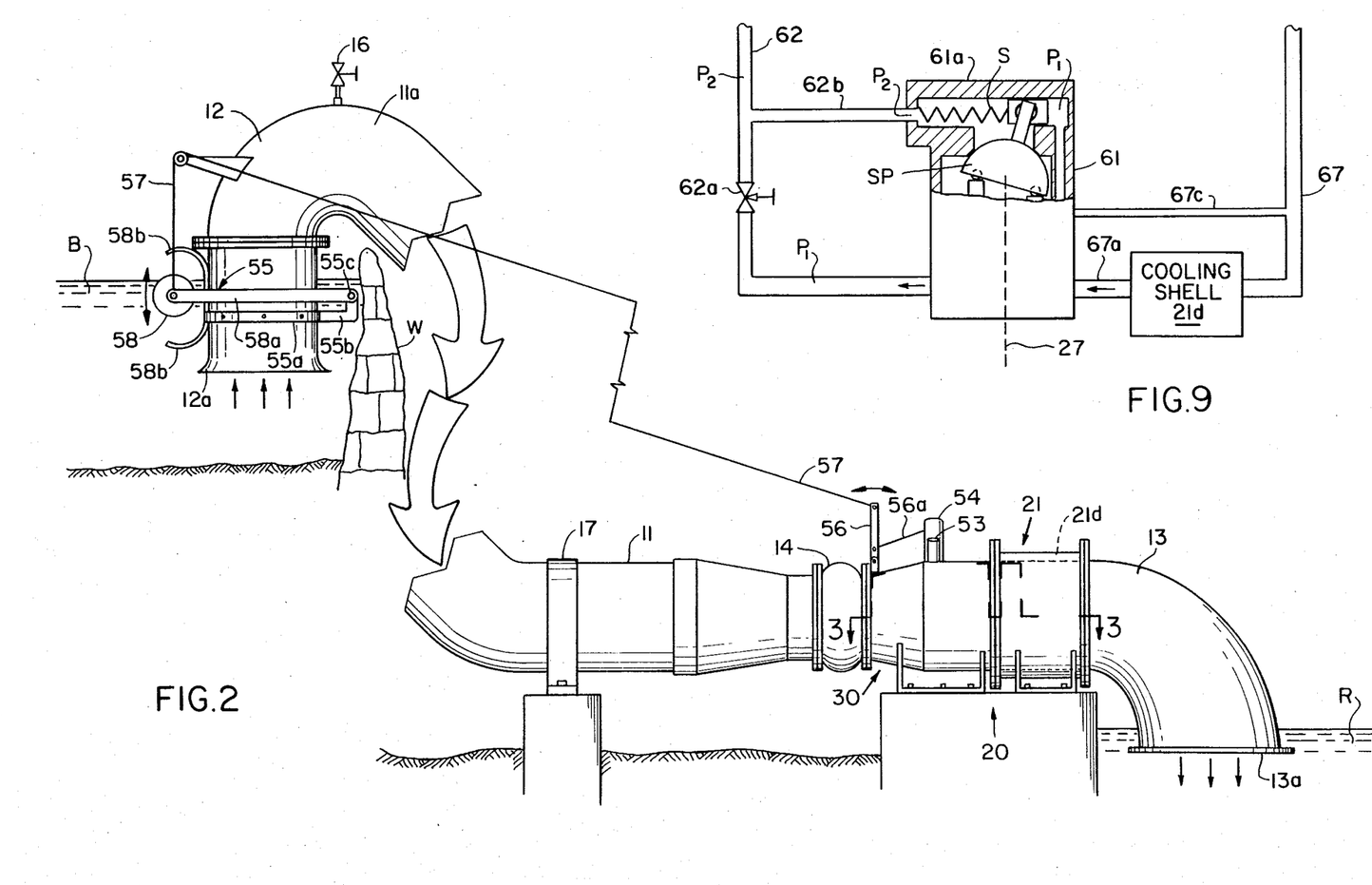
FIG. 2 is a side elevational view of the penstock installation shown in FIG. 1.
FIG. 9 is a schematic of the variable displacement hydraulic pump and associated components shown in FIG. 1 illustrating the operation of the flow control which provides for operation of the hydraulic motor at a constant RPM.

Referring in detail to the drawings, 10 generally denotes a micro-hydroelectric power plant embodying the invention and seen in FIGS. 1 and 2 to comprise a micro-hydro turbine 20 powering a hydraulic pump operated generator system 60, turbine 20 being incorporated in the lower end of a penstock 11. The latter is herein shown installed in a stream of required topography to extend as a siphon between head water basin B and tail water reservoir R, basin B being located at a predetermined height of 10 feet or more above reservoir R to provide the water power for driving turbine 20. Penstock 11 is provided with the conventional fittings for performing the siphoning action including an intake bell 12 sized, shaped and located to have its opening 12a extend beneath a predetermined low water level in head water basin B, an inverted V-shaped portion 11a extending over basin sidewall W, an outflow portion 13 terminating in an outlet opening 13a immersed in the tail water of reservoir R, a gate valve 14, a siphon-filling water supply pipe 15 having a valve 15a, an air admitting valve 16 located on the top of portion 11a and suitable securing straps 17.

Figure 3:
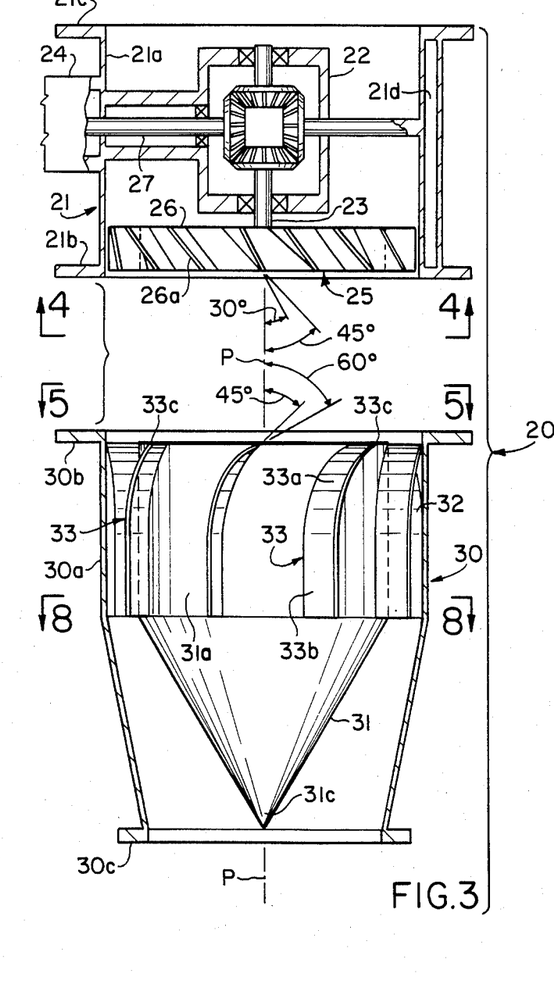
FIG. 3 is an exploded sectional view of the stator and rotor sections comprising the turbine removed from the penstock taken substantially on line 3—3 in FIG. 2 showing details of the configurations of the stator vanes and rotor blades, the flaps and control elements thereof being omitted.

Turbine 20 is a two-section construction, shown in FIG. 3 as stator section 30 and rotor section 21 having cylindrical housings 30a and 21a which are bolted together at abutting radial flanges 30b and 21b and have opposite flanges 30c and 21c for attachment to valve 14 and outflow portion 13 of penstock 11, respectively.

Stator section 30 performs a dual function, namely, (1) constricts the stream of water flowing through penstock 11 to an annular cross-sectional configuration while redirecting the axial flow to a helical swirling flow for impinging upon the blades 26 of the rotor 25 at an optimum angle of 90°, and (2) controls the volumetric flow of water through the turbine 20 relative to the volume of water available from the source stream by adjustable flaps 45 located in close proximity to the rotor blades 26 which flaps 45 narrow the annular configuration of the stream in a radially outward direction for bladetip impingement. To perform the first function, a bullet-shaped core 31 is axially mounted in housing 30a and provides a constriction formed as annular passageway 32 having a plurality of equally spaced vanes or stators 33 extending between housing 30a and a cylindrical portion 31a of core 31. Each stator 33 has a curved delivery end portion 33a extending from an axially disposed inlet end portion 33b. The curvature of end portion 33a is seen in FIG. 3 to dispose the radially inner longitudinal edge thereof, that is, the edge along the surface of core cylindrical portion 31a adjacent the radial trailing edge 33c, at 45° to the longitudinal plane P—P and to dispose the radially outer longitudinal edge of end portion 33a, that is, the edge along housing 30a, at 60° to plane P—P.

Figure 4:
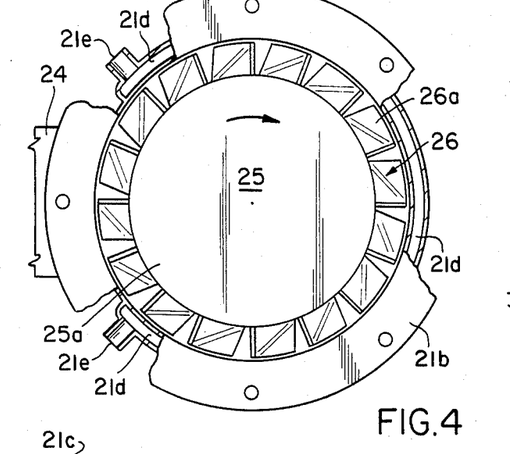
FIG. 4 is an elevational view taken on line 4—4 in FIG. 3 showing a front view of the rotor.

The structure of stator section 30 relative to the second of the dual functions thereof is hereinafter described. Attention is now directed to rotor section 21 which is seen in FIGS. 3 and 4 to comprise a rotor-mounting gear box 22 suspended by suitable struts 22a from housing 21a. A drive shaft 23 is journaled in gear box 22 to extend coaxially in housing 21a and coaxially with respect to annular passageway 32. Rotor 25 is mounted on an end of drive shaft 23 projecting from gear box 22 in close proximity to the outlet end of passage way 32 and has a hub 25a of relatively large diameter to align blades 26 with annular passageway 32. Blades 26 conform in radial length to the radius of the passageway 32 and are each disposed and of a configuration to provide a surface 26a upon which the stream of water emerging from passageway 32 impinges at an optimum angle of 90°. Thus, the radially inner portion of each blade 26 adjacent hub 25a is disposed at a 45° angle to longitudinal plane P—P and normal to the inner edges of the curved delivery end portions 33a of vanes 33 in the regions adjacent radial edges 33c. Each blade 26 curves radially outwardly from hub 25a to dispose the edge extending along the tip at a 30° angle to the longitudinal plane P—P and also normal to the radially outer edges of the curved delivery end portions 33a of vanes 33 in the regions adjacent edges 33c. A power take-off shaft 27 extends at right angles to and is driven by drive shaft 23 through suitable gearing as seen in FIG. 3. Power take-off shaft 27 extends from gear box 22 through one of the mounting struts 22a, which is constructed for the purpose, into a hydraulic pump-mounting gear box 24 mounted exteriorly on housing 21a.

Figures 5, 6:
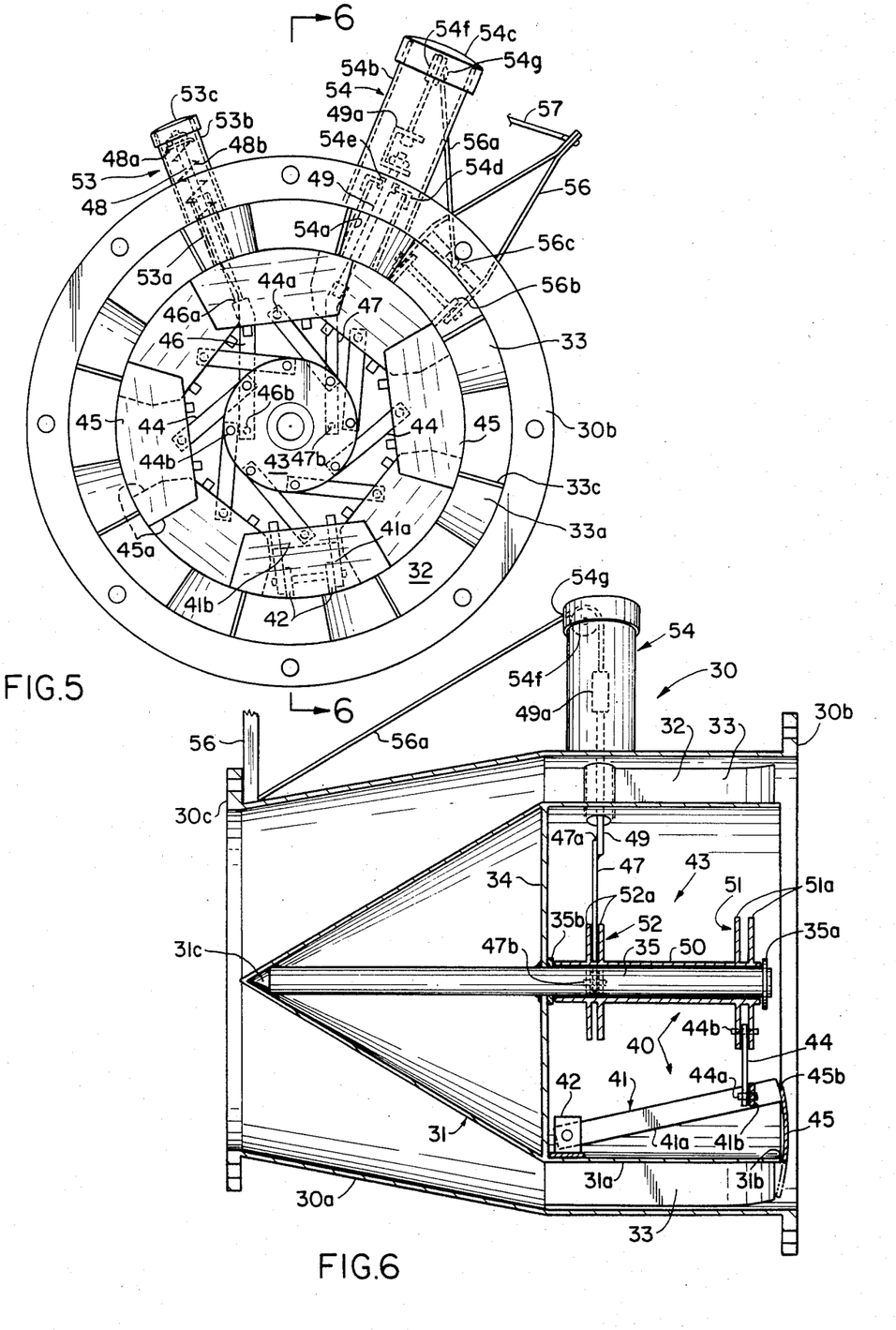
FIG. 5 is an elevational view of the stator section of the turbine as viewed along line 5—5 in FIG. 3, but with the flaps and control elements added and shown in detail, the flaps being shown in a fully retracted position for maximum flow of water through the turbine when the water in the head water basin is at a predetermined high level.
FIG. 6 is a vertical sectional view taken on line 6—6 in FIG. 5, all but one of the flaps and associated elements being omitted for clarity.
Figure 7:
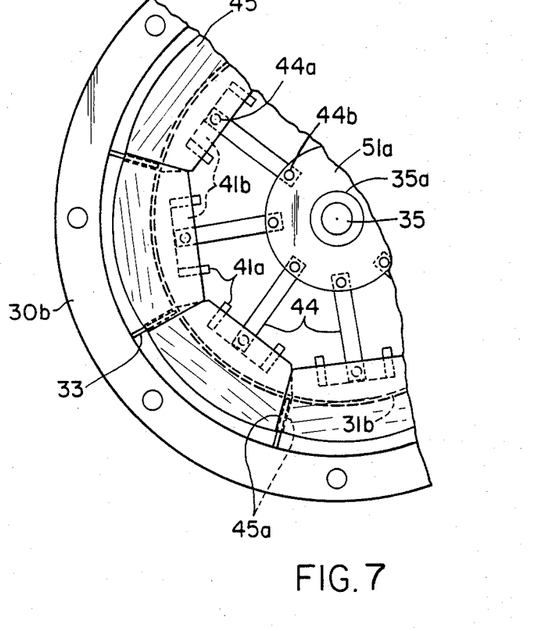
FIG. 7 is a fragmentary elevational view similar to FIG. 5 but showing the flaps in a fully extended position for minimum flow of water through the turbine.
Figure 8:
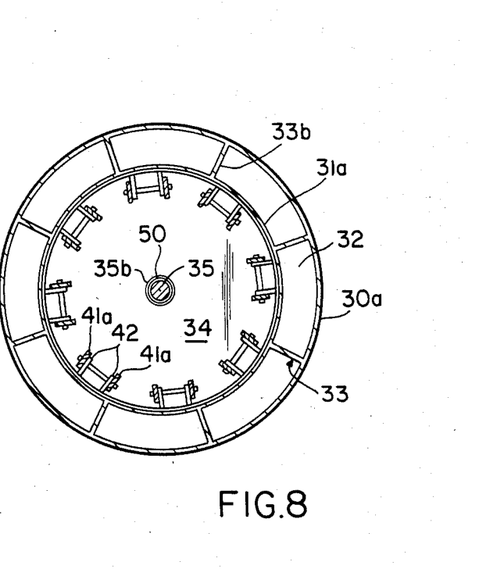
FIG. 8 is a sectional view taken on line 8—8 in FIG. 3 showing the stator vanes and the brackets pivotally mounting the lever arms for the flaps.

Referring now to FIGS. 5 and 6 showing the mechanism for performing the second function of stator section 30, 40 generally denotes a volumetric flow control in the form of a flap operator mechanism, comprising a plurality of flaps 45 arranged in a circle, each supported by the free end of a lever arm 41 pivotally attached at the opposite end thereof a bracket 42 secured to the interior surface of the cylindrical portion 31a of core 31, and an expander 43 for adjusting all lever arms 41 and flaps 45 simultaneously from a spring biased, fully retracted position shown in FIG. 5 to a fully extended position across the outlet end of annular passageway 32, as shown in FIG. 7. A weighted float assembly 55, located in and responsive to the water level in head water basin B, through cable, pulley and lever connections hereinafter described, rotates expanded 43 against the spring bias thereof to extend flaps 45 in accordance with a predetermined drop in water level.

Flaps 45 may be substantially identical in size and shape and are mounted in alternately staggered relation with respect to a transverse plane when sized to provide overlapping side edge portions 45a. The edges of the opposite edge portions 45a of each flap 45 may converge inwardly toward the axis of core 31. Each lever arm 41 is herein shown as a pair of spaced parallel bars 41a of rectangular cross-section attached, as by welding, to each of the flaps 45, the attachment being centralized with respect to opposite side edge portions 45a but adjacent to inner transverse edge 45b locating the radially outer portion of each flap 45 just beyond the open end 31b of core 31 and free for radial movement with respect thereto as will be clear from FIG. 6. Flaps 45 may have a radially curved configuration corresponding to the arc of reciprocation thereof by lever arms 41. A transverse bar 41b extends between parallel bars 41a inwardly of flap 45 and located in alignment for pivotal connection, as by pivot pin 44a, to one end of link 44 of expander 43.

A fixed shaft 35, being mounted to extend axially through cylindrical portion 31a of core 31, is supported at one end by attachment to the interior of nose cone 31c of core 31 and at a midportion by attachment to and extension through interior transverse wall 34 located at the inner end of cylindrical portion 31a. Spool 50, a component of expander 43, is rotatably mounted in cylindrical portion 31a of core 31 on fixed shaft 35, the latter terminating in a free end just inwardly of the open end 31b of core 31 and being fitted with a collar 35a retaining spool 50 in position against the inner washer 35b which in turn abuts transverse wall 34. Spool 50 has eccentric connectors 51 and 52 located adjacent opposite ends thereof and are seen in FIG. 6 to comprise pairs of closely spaced flanges 51a and 52a, respectively. Eccentric connector 51 is located in radial alignment with transverse bars 41b to receive the other end of each link 44 between flanges 51a for pivotal connection thereto by a pivot pin 44b. Eccentric connector 52, located adjacent to the inner end of spool 50, aligns with a pair of conduits 53 and 54 and links 46 and 47 associated therewith, respectively. Links 46 and 47 have ends extending between flanges 52a and are pivotally connected thereto by pivot pins 46b and 47b, respectively, which are located in substantially diametric relation with respect to fixed shaft 35.

Conduits 53 and 54 are both shown to comprise inner tubes 53a, 54a and outer tubes 53b, 54b fitted with closure caps 53c, 54c, respectively. Inner tubes 53a and 54a extend radially through annular passageway 32 and by passing through suitable openings in the wall of core 31 and housing 30a connect the interior of core 31 with the bores of outer tubes 53b and 54b, respectively, on the exterior side of housing 30a.

Conduit 53 houses the components which urge flaps 45 into the retracted position and comprise a rod 48 and compression spring 48b. Rod 48, extending axially through inner tube 53a, has a lower end located in core 31 which is suitably attached, as by weld 46a, to the upper end of link 46. The upper end of rod 48, projecting from inner tube 53a, is located in the upper portion of outer tube 53b and terminates in a radial extension or washer 48a which is retained thereon by suitable means, such as, swaging, a nut or the like. Compression spring 48b surrounds rod 48 and the upper end of inner tube 53a and acts between washer 48a and housing 30a to normally retain rod 48 in a raised position, that is, fully retracted into conduit 53. The action of spring 48b through rod 48 and link 46 causes spool 50 to rotate in a clockwise direction as seen in FIG. 5.

Conduit 54 provides access to expander 43 by the linkage responsive to the water level in head water basin B to restrict the flow of water through annular passageway 32 and penstock 11 by extending flaps 45 in proportion to the drop in such water level. To this end, conduit 54 houses a rod 49 and rotatably mounts a pulley 54f over which intermediate cable 56a extends, the latter entering the upper end of conduit 54 through a side opening 54g aligned with pulley 54f. Intermediate cable 56a is connected to the upper end of rod 49, as herein shown by U-shaped bracket 49a. Rod 49, in a manner similar to rod 48, extends through inner tube 54a and has a lower end located in core 31 which is suitably attached, as by weld 47a, to the upper end of link 47. Unlike closure cap 53c with is fitted onto the outer tube 53b to prevent leakage of water through conduit 53 from turbine 20, closure cap 54c merely prevents foreign matter from entering outer tube 54b. To prevent leakage of water through conduit 54, a cap 54d is fitted onto inner tube 54a and has a rubber grommet 54e secured in a center opening thereof through which rod 49 snugly extends for reciprocating operation. A lever arm 56, located on the exterior of housing 30a upstream from conduit 54, is shown pivotally mounted on flange 30c by a bracket 56b. Intermediate cable 56a connects to a cross-piece 56c of lever arm 56 located at a relatively short predetermined distance above the pivot of bracket 56b. A cable 57, extending from weighted float assembly 55, attaches to the free end of lever arm 56.

The weighted float assembly 55 may be provided to respond to a predetermined range of water levels in head water basin B and is shown in FIGS. 1 and 2 to comprise a weighted float 58 extending between a pair of supporting parallel arms 58a which are pivotally mounted on tranverse rod 55c. The latter is supported by a pair of arms 55b extending from a split ring bracket 55a mounted on the intake bell 12. A stop plate 58b may also be mounted on bracket 55a to limit the upward, and if desired, downward movement of float 58.

The hydraulic pump operated generator system 60 is schematically shown in FIG. 1 to comprise a variable displacement pump 61 mounted on gear box 24 to be suitably driven through intermediate gearing (not shown) by power take-off shaft 27. Pump 61 is connected to drive the hydraulic motor 65 of electric generator 70 through high pressure, output hose 62 and return, input hose 67, both of which include various interposed components hereinafter described. A manually adjustable needle valve 62a is provided in hose 62 located in relatively close proximity to pump 61 and has a feedback hose 62b which connects the outer side of valve 62a with the flow control 61a of pump 61. Except for the hydraulic fluid cooling component herein shown as jacket 21d which partially surrounds housing 21a of rotor section 21, the other components of system 60 including motor 65 and generator 70, in fulfilling a salient feature of the invention, are located at a convenient site remote from the river bed and installation of turbine 20, being connected thereto only by hoses 62 and 67. Associated with motor 65 and interposed in the return line from the latter to pump 61 are hydraulic fluid reservoir 68, filter 69 and a hose 66 which connects a filter 69 to the output of motor 65. Hose 67, equipped with a shut-off valve 67b located adjacent reservoir 68, connects the latter to one of the hose connections 21e of jacket 21d, shown in FIG. 4. The return conduit may be completed by a short hose 67a extending between the other hose connection 21e and the input of pump 61. The high pressure hose 62, provided to transmit the output from pump 61 as input to drive motor 65, has a by-pass hose 63 branching to reservoir 68 and having a normally closed valve 63a. Hose 62 may also be equipped with a relief valve 64 having a by-pass hose 64a to reservoir 68 and a visual pressure gauge 64b. Short hoses 67c and 66a connect the interior lubrication channels of pump 61 and motor 65 with hose 67 and reservoir 68, respectively, for providing suitable lubrication for the moving parts of pump 61 and motor 65 by hydraulic fluid of the system.

The practical utility and operation of micro-hydroelectric power plant 10 comprising turbine 20 powering hydraulic pump operated system 60, embodying the invention, will now be apparent. Penstock 11, when fashioned as a siphon and installed to conduct water from a suitably built head water basin B over the basin retaining wall, through turbine 20 fitted in the bottom portion thereof and into tail water reservoir R, as seen in FIGS. 1 and 2, is primed for operation, in the conventional manner, by closing valve 14 and opening air vent 16. Intake bell opening 12a may require closing off by placing a plywood sheet thereagainst. Valve 15a is then opened to admit water from the supply pipe 15. After the section of penstock 11 extending into basin B behind closed valve 14 is completely filled, as may be indicated by water escaping through air vent 16, the latter and valve 15a are closed and the plywood sheet (when used) removed preparatory to initiating the operation of turbine 20.

Generator system 60 is prepared for operation by opening valve 62a to an intermediate position and closing valve 63a to direct the entire output of hydraulic fluid from pump 61 through motor 65. Assuming the water in basin B to be at a level to position flaps 45 in the fully retracted position as shown in FIG. 5, that is, at a level above that shown in FIG. 2, operation of turbine 20 is initiated by opening valve 14 so that the flow of water through annular passageway 32 encountering the curved end portions 33a of stators 33 is diverted into a helical stream to impinge upon blades 26 at the 90° angle rotating rotor 25 with optimum transfer of energy. As illustrated in FIGS. 3 and 9, rotor 25, through drive shaft 23, power take-off 27 and suitable gearing located in gear box 24, drive swash plate SP of variable displacement pump 61 at its operating speed (1000 to 1800 RPM). The hydraulic fluid output flow in hose 62 is delivered by pump 61 at a pressure $P_1$ to the pump side of needle valve 62a, the constricting action of the latter providing a reduced output pressure $P_2$ which is delivered to motor 65 and also through feedback hose 62b to flow control 61a of pump 61. Pump 61 equipped with flow control 61a may be of any suitable, well known, variable displacement pump and flow control construction, for example, the Volvo variable displacement hydraulic pump series V30B with flow compensator QB. As seen in FIG. 9, through conduits within the pump housing, output pressure $P_1$ is applied by the construction of flow control 61a to pivot swash plate SP in a direction to reduce the swash angle and hence the pump output. A spring S, aided by the feedback of pressure $P_2$, opposes $P_1$, urging swash plate SP to pivot in an opposite direction to increase the swash angle and hence the pump output. Tension on spring S may also be adjusted by manual means (not shown) to determine the range of operation of swash plate SP.

Needle valve 62a is manually adjusted to provide the proper fixed ratio between $P_1$ and $P_2$ enabling $P_2$ to drive motor 65 at a desired 1800 RPM for the 60 cycle AC current output of generator 70. This 1800 RPM is maintained within close tolerance by a hydraulic fluid flow of constant volume provided by the operation of pump 61 and achieved by the $P_1$ to $P_2$ ratio fixed in accordance with the adjustment of valve 62a. A drop in the load on generator 70 permits the RPM of motor 65 to increase and $P_2$ to decrease. This decrease of $P_2$ appears in flow control 61a permitting $P_1$ to reduce the angle of swash plate SP and hence the output of pump 61 as a reduced $P_1$. The latter passing through valve 62a lowers $P_2$ in accordance with the fixed ratio. This lowered $P_2$ restores the constant volume flow through motor 65 to maintain the 1800 RPM at the reduced load. Conversely, as the load on generator 70 increases, motor 65 encounters greater resistance, increasing $P_2$ which is applied in flow control 61a to increase the angle of swash plate SP and hence increase the output of pump 61, increasing $P_1$, which after the effect of valve 62a, increases $P_2$ to maintain the 1800 RPM for the increased load.

The water level in basin B is shown in FIG. 2 as approximately halfway between the predetermined high and low levels within which range weighted float 58 is designed to operate. When water in basin B is at the high level or above, weighted float 58 will likewise be raised and release all tension on cable 57, lever arm 56 and intermediate cable 56a, permitting biasing spring 48b to raise rod 48 and link 46, thereby rotating connector 52 and spool 50 in a clockwise direction, as seen in FIG. 5. This correspondingly rotates connector 51 and causes links 44 to fully retract flaps 45. As the water level in basin B drops below the predetermined high, cable 57, lever arm 56 and intermediate cable 56a are pulled by the downward movement of weighted float 58 exerting an upward pull on rod 49 and link 47 to rotate connector 52 and spool 50 is a counterclockwise direction compressing spring 48b. This correspondingly rotates connector 51 to progressively extend flaps 45 radially outwardly into passageway 32 as the water level in basin B proportionally drops. When the water level in basin B drops to the predetermined low or below, weighted float 58 will engage the lower member of stop plate 58b in which position flaps 45 will be fully extended, as shown in FIG. 7, projecting across annular passageway 32 approximately 4/5 the radial distance from core portion 31a to housing 30a.

The provision of lever arm 56, whereby cable 57 attaches to the free end thereof and intermediate cable 56a connects at a short distance from the pivoted end, enables the relatively longer range of movement of weighted float 58 to be reduced to the shorter range of movement required to rotate spool 50 between the fully retracted and fully extended positions of flaps 45 and also utilizes the mechanical advantage of about 6 to 1 of the lever for operating expander 43. However, within the scope of the invention, any suitable means for sensing the water level in basin B and operating expander 43 to accordingly adjust flaps 45 may be used.

The provision of the 45°—45° relation at the bases and the 60°-30° relation at the outer edges of the stator delivery ends 33a with respect to the tips of blades 26 is valid for turbine diameters of different sizes which may be selected in accordance with the available water supply and typography of the selected site provided the radial dimensions of passageway 32 and length of blades 26 are approximately 19% of the radii of housings 21a and 30a.

As hereinbefore described, a drop in the load on generator 70 results in a comparable drop in the output of pump 61 by a reduction in the angle of swash plate SP. This also causes a drop in the load on turbine 20 resulting in an increase in the RPM of rotor 25 which in turn increases the flow of water through penstock 11 and the drain on the water supply in basin B. When there is an excess of water in basin B this increase flow will not effect weighted float 58. However, when the water supply is limited so that this increased flow results in a water level drop within the operating range of weighted float 58, flaps 45 will correspondingly and automatically close to conserve water during minimum load requirements of generator 70. Likewise, when the limited water supply requires turbine 20 to operate with flaps 45 partially or fully closed, the contours of stators 33 coact with that of blades 26, in accordance with the invention, providing optimum transfer of energy from the stream of water to the rotor 25.

The opening of the normally closed valve 63a permits the output of pump 61 to feed directly through hose 63 into reservoir 68 thereby stopping motor 65 and generator 70, when so required for servicing and the like, without effecting the continuing operation of the components at the river bed. Thereafter, merely closing valve 63a will restore the operation of motor 65 and generator 70.

Whereas the disclosure utilizes direct gearing in the power take-off from rotor 25, it is also contemplated that a chain and sprocket arrangement may be used to connect drive shaft 23 with gear box 24 or directly to the drive shaft of pump 61.

The incorporation of cooling jacket 21d in housing 21a of rotor section 21 in convenient close proximity to pump 61 is a preferred, simple and inexpensive use of the cooling capacity of the water passing through turbine 20 to maintain the temperature of the hydraulic fluid circulating in system 60 below the desired 170° F. However, other heat dissipating devices may also be used for this purpose.

The hydroelectric power plant comprising the micro-hydro turbine construction powering a hydraulic pump operated generator system herein disclosed is seen to achieve the several objects of the invention and to be well adapted to meet conditions of practical use. As various possible embodiments might be made of this invention, and as various changes might be made in the disclosed power plant, it is to be understood that all matters herein set forth or shown in the accompanying drawings are to be interpreted as illustrative and not in a limiting sense.

What is claimed is:

1. A hydroelectric power plant comprising a penstock located in a stream diverting water therethrough from an intake basin located at a predetermined height above an outlet basin, a hydro turbine incorporated in a lower portion of the penstock having a rotor driven by the flow of water through the penstock, a closed hydraulic system through which hydraulic fluid circulates, said system comprising a variable displacement pump having a flow control, a hydraulic motor, an electric generator driven by said motor, drive and gearing means interposed between said turbine rotor and pump for driving the latter in a range of RMP between 1000 and 1800, said pump and flow control maintaining the input flow of hydraulic fluid to said motor at a constant volume whereby said motor and generator are driven at a predetermined RPM at all acceptable load conditions placed on said generator, said pump and flow control being mounted in close proximity to said turbine, and said hydraulic motor and generator being located remote from said turbine and pump with said hydraulic fluid conduits extending therebetween.

2. The hydroelectric power plant defined in claim 1 in which said hydraulic fluid conduits include a hose conducting a high pressure output from the pump to drive the motor, and a manually adjustable needle valve interposed in said hose forming a component of said flow control to adjust said constant volume flow to drive said motor at the predetermined RPM.

3. The hydroelectric power plant defined in claim 1 in which said hydro turbine is a micro-axial-flow turbine having a stator section formed with a cylindrical housing and an axial core providing an annular passageway, adjustable flaps movable radially inwardly to a retracted position and radially outwardly to extended positions narrowing said annular passageway to restrict the volumetric flow of water through said annular passageway and penstock, water level sensing means located in said intake basin and being operative in a range of predetermined water levels, and flap operating means controlled by said sensing means positioning said flaps in predetermined relation with respect to water levels in said range.

4. The hydroelectric power plant defined in claim 1 in which said hydro turbine is a micro-axial-flow turbine having a cylindrical housing, said closed hydraulic system including a cooling means formed as a jacket in said cylindrical housing through which the hydraulic fluid circulates whereby the stream of water passing through said turbine cools said jacket and the hydraulic fluid circulating therein.

5. A micro-hydro turbine mounted in a lower portion of a penstock, the latter being located in a stream diverting water therethrough from an intake basin located at a predetermined height above an outlet basin, said turbine having a stator section formed with a cylindrical housing and an axial core providing an annular passageway having an outlet end, adjustable means for moving radially inwardly to a retracted position and radially outwardly to extended positions narrowing said annular passageway to restrict the volumetric flow of water through said annular passageway and penstock, a float mechanism in said intake basin following the water level therein, and linkage between said adjustable means and said float mechanism controlling said extended positions to reduce said penstock water flow in predetermined relation to said water level.

6. The micro-hydro turbine defined in claim 5 in which said turbine includes a rotor section having a rotor mounted adjacent to said stator section outlet end for rotation coaxially with said annular passageway by the stream of water flowing therethrough, said rotor having blades of a length equivalent to and in alignment with the internal radius of the annular passageway.

7. The micro-hydro turbine defined in claim 6 in which said annular passageway has fixed vanes directing said stream of water at said passageway outlet end in a helical swirling motion of predetermined pitch, said rotor blades each having a water impinging surface disposed in angular relation to an axial plane of the rotor whereby said helical stream flowing at said predetermined pitch impinges upon said blade surface at an angle of substantially 90°.

8. The micro-hydro turbine defined in claim 6 in which said adjustable means for narrowing the annular passageway is located between said outlet end of the annular passageway and said rotor, said adjustable means when in said extended positions directing the flow of water to a path along the radially outer portion of the passageway to impinge upon correspondingly aligned tip portions of said blades.

9. The micro-hydro turbine defined in claim 5 in which said adjustable means for narrowing the annular passageway comprises a plurality of flaps arranged in an expandable circle at said passageway outlet end, each flap being carried by a lever arm mounted within said axial core, and an expander controlled through said linkage by said float mechanism operating said lever arms simultaneously whereby the flaps are moved between said retracted and expanded positions for said passageway narrowing.

10. The micro-hydro turbine defined in claim 9 in which said expander comprises a spool mounted for axial rotation within the core and has a pair of eccentric connectors formed as opposite flanges, a first of said connectors having a first link to each of said lever arms for said flap movement upon rotation of said spool.

11. The micro-hydro turbine defined in claim 10 in which a second of said eccentric connectors has a second and third link for antagonistic rotation of said spool, said second link connecting to a spring means normally biasing said spool, lever arms and flaps in said retracted position, and said third link connecting to said linkage and float mechanism.

12. The micro-hydro turbine defined in claim 11 in which said stator section has a pair of spaced conduits extending through said annular passageway communicating with the interior of said core, said spring means being housed in a first of said conduits, a second of said conduits communicating with the exterior of said cylindrical housing, said linkage to the float mechanism including a cable extending into said second conduit for said connection to said third link.

13. The micro-hydro turbine defined in claim 9 in which said stator section has a conduit extending through said annular passageway communicating the interior of said core with the exterior of said cylindrical housing, said linkage including an exterior lever arm pivotally mounted to said housing interposed in a cable means extending from said float mechanism and through said conduit, said exterior lever arm providing a mechanical advantage by movement reduction of said float mechanism with respect to said expander.

14. The micro-hydro turbine defined in claim 13 in which said expander comprises a spool mounted for axial rotation within the core and has an eccentric connector formed as a flange, spring means connected to a first portion of said flange biasing said spool for rotation in a first direction whereby said flaps are normally retained in said retracted position, said cable means connecting to a second portion of said flange for rotating said spool in an opposite direction whereby said flaps are moved to expanded positions by said float mechanism against the action of said spring means.

15. The micro-hydro turbine defined in claim 5 in which said penstock is a siphon extending between said intake and outlet basins.

16. A micro-hydro turbine mounted in a lower portion of a penstock, the latter being located in a stream diverting water therethrough from an intake basin located at a predetermined height above an outlet basin, said turbine comprising stator and rotor sections, each having a cylindrical housing of predetermined cross-section, said stator section having a bullet-shaped, coaxially mounted core, said core having a cylindrical portion adjacent an outlet end of said stator section providing an annular passageway between the core and said stator housing, a plurality of equally spaced fixed vanes extending in a longitudinal direction and radially between said housing and core cylindrical portion dividing said passageway into equal sections, each of said vanes having a curved delivery end portion extending from a longitudinal inlet portion disposed parallel to the axis of the core, whereby a stream of water enters an inlet end of each passageway section in a path parallel to the core axis and is diverted in a helical swirling motion about said core axis by said curved delivery end portions of said vanes, a rotor mounted for axial rotation in said rotor section facing and in close proximity to the outlet end of said stator, said rotor having a plurality of blades, each extending radially from a hub and of a height from hub to tip conforming to the radius of said annular passageway, each of said blades having a water impinging surface disposed at a predetermined angle to an axial plane and substantially normal to said vanes at the trailing ends of said curved delivery end portions thereof whereby said swirling stream of water emitted from said annular passageway sections impinges upon said blade surfaces at approximately 90°.

17. The micro-hydro turbine defined in claim 16 in which said delivery end portions of said vanes are curved both longitudinally and radially, said radial curvature from core to housing being in a direction opposite to the flow of water through said annular passageway, said rotor blade water impinging surfaces being curved radially from hub to tip in the direction of flow of said stream, said vane end portion radial curvature directing the stream of water and said rotor blade radial curvature receiving the impact thereof in a manner to compensate for the increase in linear velocity of points on the blade surfaces of the rotating rotor as their distances from the axis of rotation increase.

18. The micro-hydro turbine defined in claim 17 in which each of said vane end portions has an edge adjacent said core cylindrical portion disposed at an angle of 45° to an axial plane of the stator section and an edge adjacent said housing disposed at an angle of 60° to said axial plane providing said radial curvature from core to housing, said predetermined angle of said rotor blades at the hub being 45° and at the tips being 30° providing said rdial curvature of the water impinging surfaces.

19. The micro-hydro turbine defined in claim 18 in which said rotor blade height from hub to tip and said conforming radius of the annular passageway are on the order of 19% of the radius of said predetermined cross-section.

20. The micro-hydro turbine defined in claim 16 in which a plurality of flaps are arranged in an expandable circle located at said stator section outlet end for radial movement inwardly to a retracted position and outwardly to extended positions narrowing said annular passageway, a float mechanism in said intake basin following the water level therein, a linkage between said flaps and said float mechanism controlling said extended positions to reduce said penstock water flow in predetermined relation to said water level, said flaps when in said extended positions directing the flow of water to a path along the radially outer portion of said passageway to impinge upon correspondingly aligned tip portions of said blades.

21. The micro-hydro turbine defined in claim 20, an electric generator at a location remote from turbine, and a closed hydraulic system through which hydraulic fluid circulates comprising a variable displacement pump, a hydraulic motor, hydraulic fluid conduits connecting said pump to drive the motor, said pump being mounted in close proximity to said turbine, and mechanical power take-off means connecting said rotor to drive said pump, said motor being at said remote location driving said generator.

* * * * *